Aug. 12, 1969  R. H. KIRKHOF  3,460,685
ARTICLE STACK FORMER, REGULATOR, AND HANDLER
Filed Feb. 24, 1967  2 Sheets-Sheet 1

INVENTOR.
RUSSEL H. KIRKHOF
BY
ATTORNEYS

Aug. 12, 1969 R. H. KIRKHOF 3,460,685
ARTICLE STACK FORMER, REGULATOR, AND HANDLER
Filed Feb. 24, 1967 2 Sheets-Sheet 2

INVENTOR.
RUSSEL H. KIRKHOF
BY
ATTORNEYS

United States Patent Office 3,460,685
Patented Aug. 12, 1969

3,460,685
ARTICLE STACK FORMER, REGULATOR, AND HANDLER
Russel H. Kirkhof, Marne, Mich., assignor to Kirkhof Manufacturing Corporation, Grand Rapids, Mich., a corporation of Michigan
Filed Feb. 24, 1967, Ser. No. 618,470
Int. Cl. B65g 57/00
U.S. Cl. 214—6      3 Claims

ABSTRACT OF THE DISCLOSURE

Apparatus and method of high speed translation of lightweight, three dimensional shell-type articles, such as plastic trays, with controlled pneumatic advancing, and preferably in combination with pneumatic stacking.

Background

This invention relates to a method and apparatus for translating and stacking articles, particularly lightweight, three dimensional shell-type articles.

Lightweight three dimensional articles such as trays can now be formed at extremely rapid rates by pressure differential techniques and equipment from a continuous plastic web. These tray-type articles, discharged from a forming press and the web matrix in rapid sequence, have created a handling problem. Previously, the forming rate of such articles has been low enough that mechanical advancement of such on conveyor belts, followed by, manual stacking, have been completely satisfactory. This is no longer so.

While basic pneumatic handling of sheet stock is known, the normal application of air jets to these tray-type articles, creates problems since these articles tend to either slide uncontrollably and often reluctantly or to become uncontrollably buoyant, and since they cause difficulty of stacking due to their three dimensional configuration as contrasted to ordinary sheet stock.

Summary of the invention

It is an object of this invention to provide a method and an apparatus for translating and stacking lightweight, three dimensional, shell-type objects rapidly and dependably, in spite of their tendency to become uncontrollably buoyant. No manual effort is necessary for either operation. Mechanical conveyor equipment can be eliminated.

Another object of the invention is to provide a novel method and apparatus for controllably pneumatically advancing such articles.

The invention employs pneumatic advancement with special track and restraining means for controlled buoyancy pneumatic advancement, preferably in combination with pneumatic stacking, using special stack forming restraining means.

These and other objects of this invention will become apparent from a study of the following drawings.

Drawings

Description of the preferred embodiment

Figure 4:
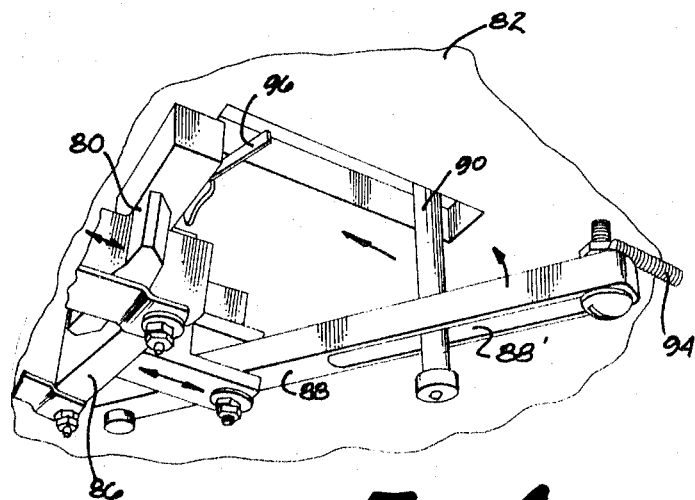
FIG. 4 is a fragmentary, enlarged, perspective view of a portion of the gate operating mechanism for the apparatus in FIGS. 1 through 3.

Referring now specifically to the drawings, the apparatus 10 includes in combination pneumatic advancing or translating means 12 and pneumatic stacking means 14 positioned at the discharge end of advancing means 12.

Advancing subassembly 12 includes a basic support platform 16 which is generally elongated in nature, and is divided up into a plurality of parallel elongated zones by a plurality of upstanding parallel elongated partitions 18. These elongated zones form passageways for laterally restraining the three dimensionally configurated, lightweight, inverted, shell-type articles such as plastic trays T or tray-type articles formed by pressure differential techniques from a continuous plastic web. Each of these zones basically forms a track means for these articles, with each track means including an elevated skid type runner 20 generally centrally positioned thereof. Each runner has a width which is only a fraction of the width of the articles and of the track zone to provide limited contact on the underside of the articles, and to create a spacing between the underside of the article and the upper surface of platform 16.

Extending transversely across the elongated tracks is an air manifold 26 which has a plurality of outlet port or jet elements, preferably with each jet being aligned with one of the respective track zones. The outlet nozzles or ports 28 are oriented diagonally downwardly and toward the discharge end of the tracks and toward the stacking means of the tracks.

The track skids 20 have been found to serve effectively for preventing uncontrolled buoyance beneath the shell-type, inverted articles, while allowing some buoyance, causing the trays to move along or just slightly above the skid 20, rather than tending to be floated upwardly in a manner to allow the air jets to become ineffective in advancing the lightweight articles to the end of the track means. It is believed that this reliable operation is due to the air inlet and air escape provided by communication of the air through the spacing effected between the underside of the shell article and the upper surface of platform 16. Hence, the air jets cause articles T to be rapidly and reliably advanced into the stacking means, off the discharge end of the track means.

Stacking subassembly 14 includes article supports which may be a vertically movable platform 30, positioned below the discharge end of the tracks, and shown in this embodiment to be supported on a column 32 which is biased upwardly by a biasing means such as a spring 34 or a suitable counterweight (not shown) to counterbalance the weight of a stack of articles formed upon it. This article support 30 is here shown as an elongated member capable of accommodating all five of the track means illustrated in this particular embodiment. Each article stacking zone, e.g. 30′ (FIG. 2), is bounded by vertical restraining means. The laterally positioned restraining means preferably includes, for example, a pair of vertical rods 32 on each side of the zone, and an end rod 34. This end rod also preferably serves as gate means for discharge of the stack, in a manner to be described hereinafter. Rods 32 may have their lower ends fixedly mounted on a support member 33.

Figure 1:
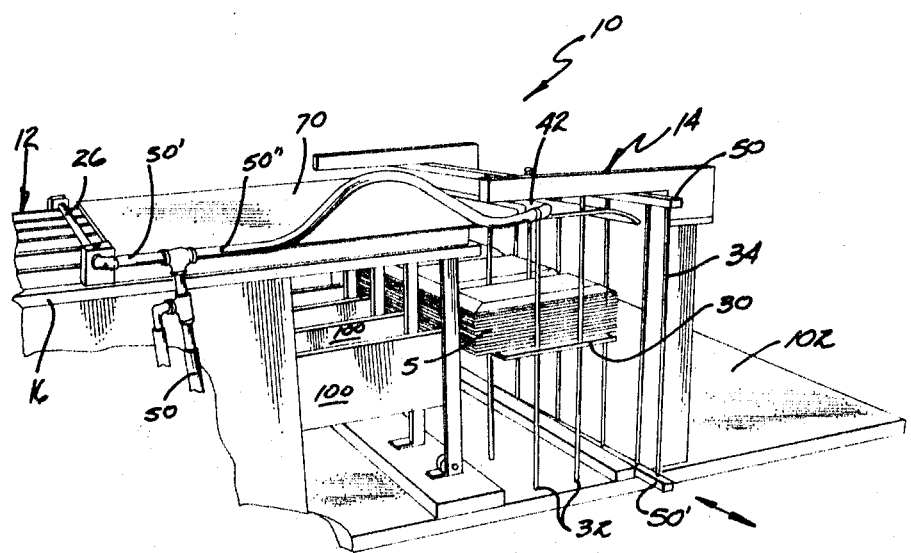
FIG. 1 is a perspective fragmentary view of the novel apparatus.

Articles propelled off the discharge end of the track means are first halted in their forward movement by abutment with the stop rods 34 aligned with the article tracks, and then instantly propelled downwardly into a stacked relationship by respective downwardly oriented air jets 40 from a second compressed air manifold 42. Compressed air may be supplied to both manifold 42 and manifold 26 by a common supply line 50 (FIG. 1) which branches into branch line 50′ and 50″ for the manifold. This downwardly propelled air stream projected against and aligned with each tray assures its controlled and oriented downward movement directly onto the stack being formed on article support 30.

Figure 2:
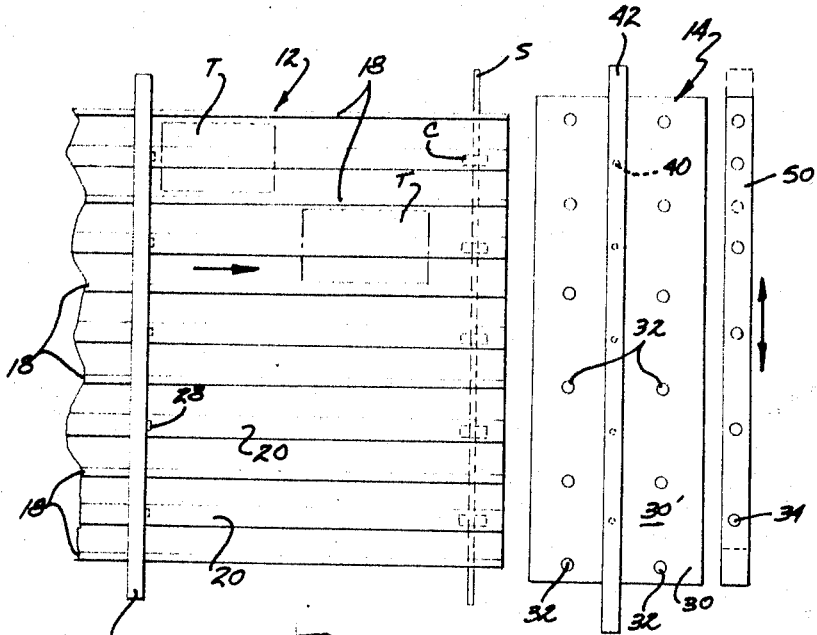
FIG. 2 is a plan view of the apparatus in FIG. 1, shown with the hold down panel removed.

The stop means formed by posts 34 also comprises a gate means in a preferred form of the device. More specifically, securing the upper and lower ends of post 34 is a pair of mounting elements 50 and 50′ of generally elongated configuration (FIG. 2). This entire gate assembly can shift laterally, i.e. transversely of the track means, from a first position in which the posts 34 act as stops aligned with the track means, to a second position shown by the phantom lines in FIG. 2 where the posts 34 are aligned with posts 32, i.e. not with the track means. The operation of this will be discussed hereinafter.

Overlying and overlapping both the track means and the stacking means is an article restraining panel 70 (FIGS. 1 and 3) which is spaced above the skid an amount greater than the article height. It serves to generally form enclosed channels of the track means, and serves to prevent any articles which might accidentally become buoyant from floating uncontrollably off the assembly, thereby assisting the skids 20. It also serves to direct and restrain the shell-type articles ejected from the track means into the stacking station to prevent them from tipping uncontrollably. Thereby, the trays are ejected into the stacking area under this panel, and into abutment with rods 34, after which they are directed downwardly by the air jets 40 onto the article supports 30. Openings are provided in this panel for jets 40.

Figure 3:
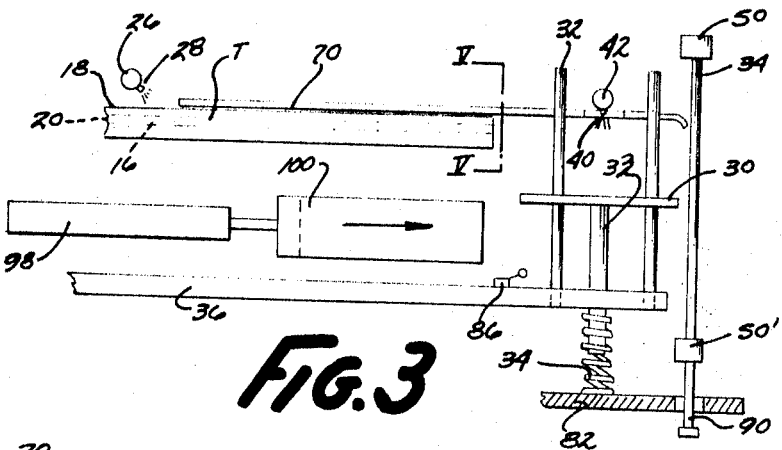
FIG. 3 is a side elevational view of the apparatus.
Figure 5:
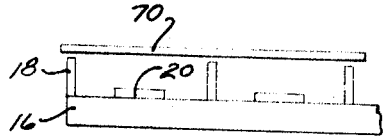
FIG. 5 is a partial, end elevational view taken on plane V—V of FIG. 3.

After the articles stack up on support 30, the stack is discharged from support 30. The number of articles in the stack may be controlled by the weight of the stack and its downward movement, to operate a limit switch, or, since the weight of the individual articles tends to vary somewhat, the number of articles in each stack is preferably controlled by a plurality of counters C shown in phantom on a support S in FIG. 2. Each counter cooperates with trays in each track to indicate the number of articles being formed in each stack. After a predetermined number of articles is stacked, the counters may electrically energize a solenoid assembly to retract solenoid armature 80 (FIG. 4) mounted beneath support plate 82 (FIGS. 3 and 4). If the number of items in a stack is weight controlled, a suitable limit switch 86 (FIG. 3) may be actuated by the lowered support 30, to activate the solenoid. In the form of the device illustrated, the solenoid armature 80 is connected to a T-shaped linkage 86 which in turn is pivotally connected intermediate the ends of a pivotal rod 88. Fitting through an elongated slot 88′ of this rod is a pin 90 connected to the gate unit that contains stop rods 34 as individual gates (FIG. 3). By the solenoid shifting lever 88 from its biased position by spring 94, this pin 90 is shifted, to shift the gate from the first to the second positions shown in solid and phantom lines in FIG. 2, respectively. Movement of this gate unit to its extreme shifted position causes actuation of limit switch 96 which electrically activates a control air valve (not shown) to an air cylinder 98 (FIG. 3). This cylinder has on the end of its rod a plurality of shoving plates 100 aligned with the respective plurality of stacks S of trays T (FIG. 1) to discharge the stacks through the gate means. Suitable receiving cartons may be supported on platform 102 (FIG. 1) to receive the stacks of articles.

Alternative methods of discharging and supporting the stacks may be employed within the concept of this invention.

The operation of this apparatus will be apparent from the detailed description above. Briefly, the articles such as trays T are introduced onto the respective tracks from a suitable forming press, are advanced rapidly along the tracks by the air jets 28, while being controllably restrained vertically and laterally, past the counters C, if used, into the stacking zones 30′ between rods 32, and into abutment with stop rods 34. At this time, the continuously operating downwardly oriented air jets depress the tarys into a stack on article support 30. In the form of the invention illustrated, the article support 30 is depressed by the weight of the stack against the biasing force, until the counters activate the gate means, or alternatively the weight of the articles on the support means activates the gate means. After the gate means is shifted, the discharging cylinder is activated, to cause the stacks to be shifted from the platforms and onto a receiving surface or into cartons as desired.

It is entirely possible that details of certain aspects of this assembly may be modified within the concept of the invention presented. For example, the stack removing feature may be modified in various ways after the trays have been advanced and stacked in the novel fashion. Hence, the invention is intended to be limited only by the scope of the appended claims and the reasonably equivalent structures and methods to those defined therein.

I claim:

1. High speed translating and stacking apparatus for lightweight, three dimensional, shell-type inverted plastic trays comprising: elongated trackway means of substantially the same width of said trays for traverse of inverted trays, including a discharge end; tray receiving stack forming means at said discharge end; pneumatic discharge tray advancing means at said trackway means having air discharge ports oriented toward the ends of the trays to advance them along said trackway means to said article receiving stack forming means; said trackway means including centrally located, raised, elongated tray engaging portions underlying only a fraction of the tray width so that said tray overhangs on each side of said engaging portions and thereby extends over and is spaced from said remaining portions of said track means to leave a controlled air space beneath the remainder of the tray width for causing controlled buoyancy of the lightweight trays as they are pneumatically advanced; and said tray receiving stack forming means having article support means below the level of said trackway means and pneumatic discharge, article stacking means oriented to push the article from said discharge end downwardly onto said article support means into a stack.

2. A method of handling lightweight three dimensional shell-type plastic tray articles comprising the steps of: positioning the plastic trays in inverted position with the open side downwardly on an elongated elevated skid surface located within a trackway of substantially the same width as said trays, such skid surface extending under only part of the tray width, to cause a controlled air gap beneath the other parts of the tray width, propelling said trays along the skid surface with an air jet directed toward an end of the individual trays while creating a controlled buoyancy beneath the trays by reason of the controlled air gap creating controlled air communication therethrough, and laterally retaining the advancing trays aligned with respect to said skid surface.

3. The method of claim 2 including the steps of propelling said article off the end of said surface, and then pneumatically propelling said article downwardly into a stacking relationship.

References Cited

UNITED STATES PATENTS

| | | | |
|---|---|---|---|
| 1,789,479 | 1/1931 | Smith | 302—2 |
| 1,966,878 | 7/1934 | Bluzat | 214—6 X |
| 2,101,328 | 12/1937 | Broadmeyer | 214—6 X |
| 2,377,294 | 5/1945 | Belada et al. | 214—1 X |
| 2,697,388 | 12/1954 | Hansen et al. | 214—6 X |
| 2,833,391 | 5/1958 | Wilcox | 198—31 |
| 2,988,402 | 6/1961 | Policansky | 302—2 |
| 3,064,827 | 11/1962 | Bostock et al. | 214—6 |
| 3,123,218 | 3/1964 | Bronson | 214—6 X |
| 3,331,516 | 7/1967 | Gubeli | 214—6 |

FOREIGN PATENTS 791,600  3/1958  Great Britain.

GERALD M. FORLENZA, Primary Examiner

R. J. SPAR, Assistant Examiner

U.S. Cl. X.R.

214—152; 302—2